United States Patent
Sahai et al.

(10) Patent No.: US 6,594,699 B1
(45) Date of Patent: Jul. 15, 2003

(54) SYSTEM FOR CAPABILITY BASED MULTIMEDIA STREAMING OVER A NETWORK

(75) Inventors: Anupam Sahai, Santa Clara, CA (US); Ram K. Gupta, Sunnyvale, CA (US); Jitendra Kothari, Mt. View, CA (US)

(73) Assignee: Kasenna, Inc., Mountain View, CA (US)

( * ) Notice: Subject to any disclaimer, the term of this patent is extended or adjusted under 35 U.S.C. 154(b) by 0 days.

(21) Appl. No.: 08/948,668

(22) Filed: Oct. 10, 1997

(51) Int. Cl.[7] .............................................. G06F 13/00
(52) U.S. Cl. ....................... 709/228; 709/231; 709/232; 709/233; 725/116; 725/105
(58) Field of Search ........................ 395/200.58, 200.61; 709/228, 231, 224, 232, 233; 725/86, 87, 105, 114, 116

(56) References Cited

U.S. PATENT DOCUMENTS

| | | | |
|---|---|---|---|
| 5,491,800 A | * 2/1996 | Goldsmith et al. | 709/221 |
| 5,548,723 A | * 8/1996 | Pettus | 709/228 |
| 5,630,067 A | * 5/1997 | Kindell et al. | 709/231 |
| 5,712,976 A | * 1/1998 | Falcon, Jr. et al. | 725/115 |
| 5,758,078 A | * 5/1998 | Kurita et al. | 709/203 |
| 5,805,821 A | * 9/1998 | Saxena et al. | 709/231 |
| 5,892,767 A | * 4/1999 | Bell et al. | 370/432 |
| 5,925,104 A | * 7/1999 | Elbers et al. | 709/231 |
| 5,928,330 A | * 7/1999 | Goetz et al. | 709/231 |
| 5,953,506 A | * 9/1999 | Kalra et al. | 709/231 |
| 6,018,619 A | * 1/2000 | Allard et al. | |
| 6,154,778 A | * 11/2000 | Koistinen et al. | 709/228 |
| 6,185,625 B1 | * 2/2001 | Tso et al. | 709/247 |
| 6,240,243 B1 | * 5/2001 | Chen et al. | 386/125 |
| 6,279,040 B1 | * 8/2001 | Ma et al. | 709/231 |

OTHER PUBLICATIONS

IBM TDB; Multi–Rate Video Transmission Scheme; vol. 38, Issue 12, pp. 59–62; Dec. 1995.*
IBM TDB; Method to Deliver Scalable Video Across a Distributed Computer System; vol. 37, Issue 5, pp. 251–255; May 1994.*

(List continued on next page.)

*Primary Examiner*—Kenneth R Coulter
(74) *Attorney, Agent, or Firm*—Dorsey & Whitney LLP; R. Michael Ananian

(57) ABSTRACT

The present invention is a system in which packet-switched (or general purpose network) multimedia data streaming is controlled based on the capabilities of a client and the preferences of a user. A server processor, coupled to the client processor over a packet-switched network, such as the Internet, receives client processor capabilities in association with a request for service for a multimedia type data transfer. The capabilities can be obtained by an application running on the client assessing the capabilities or through prompting of the user. The client capabilities include, for example, processor speed and multimedia encoders of the client. The server can also obtain the preferences of the user of the client processor and respond based on the preferences. Preferences include, for example, the quality of service of the transfer. The capabilities and preferences can be obtained via a query from the server to the client or can be automatically sent with each request. The data format is chosen, the data is adapted and transferred over the network by the server responsive to the capabilities and preferences and played to the user by the client.

52 Claims, 3 Drawing Sheets

OTHER PUBLICATIONS

Kurt Rothermel et al.; "QoS Negotiation and Resource Reservation for Distributed Multimedia Applications"; Proc. IEEE International Conf. on Multimedia Computing and Systems '97; pp. 310–326, Jun. 1997.*

O. Megzari et al.; "A Distributed Platform for Interactive Multimedia"; 1994 Canadian Conf. on Electrical and Computer Engineering; pp. 755–758 Sep. 1994.*

StreamWorks Server, May 8, 1997.

Web Theater 2 Product Datasheet, 1997.

Nelson et al., MediaBase: Streaming Media Serving for the Web, pp. 1–28, May 1997.

WebForce MediaBase—Mediabase 2.0 Brochure, 1997.

WebFORCE Media Server, Aug. 15, 1996.

AudioCenter, StreamWorks, 1994.

* cited by examiner

SYSTEM FOR CAPABILITY BASED MULTIMEDIA STREAMING OVER A NETWORK

BACKGROUND OF THE INVENTION

1. Field of the Invention

The present invention is directed to a system that performs streaming of multimedia data between a server processor and a client processor based on the capabilities of the client and, more particularly, to a system in which the server obtains from the client information about the streaming capabilities and specifications of the client, can obtain information from a user about streaming preferences and performs streaming of multimedia from the server to the client based on the results obtained.

2. Description of the Related Art

In typical media-on-demand multimedia streaming products, such as the Silicon Graphics, Inc. (SGI) Cosmo MediaBase™ 1.0, the multimedia streaming is entirely controlled by the server side of the software. All the user, at the client end, does is to click on the Universal Resource Locator (URL) associated with the multimedia asset, and the client gets the video/multimedia streams that are streamed across the network to the client. There is no negotiation involved between the client (processor) and the server (processor), and the delivery properties for streams are decided based on the asset properties determined at installation time. Other products, such as one from Xing Technologies, allows users to set some firewall specific parameters, which influence how the stream is delivered to the client.

A client-server interaction is characterized by an initial service request from the client to the server. The client request describes the service requested, which enables the server to service the request. In application scenarios like media streaming, it helps the decision making process on the server machine to know client preferences, capabilities and other relevant information.

In multimedia data streaming, as noted above, the data transfer is entirely controlled by the server. There is no negotiation involved between the client and the server, and the delivery properties for the delivered audio/video (multimedia) streams are predetermined based on the properties of the multimedia asset determined during installation. This can be very restrictive in certain situations, and this also puts minimum hardware and software requirements on the various clients which can get attached to the server and playback multimedia data. Typical requirements for a PC to act as a MediaBase client are >150 Mhz Pentium™ PC with greater than 32 MB of memory. Currently there is no way to distinguish between different clients, their hardware and software capabilities, and use that information to do intelligent streaming of multimedia data by the server.

What is needed is a system in which the server obtains information concerning client data receipt capabilities and user preferences and performs intelligent data transfer based on the capabilities and preferences.

SUMMARY OF THE INVENTION

It is an object of the present invention to provide a system in which the server is aware of the client hardware and software capabilities, client specifications and the user preferences when the server is servicing a client request.

It is another object of the present invention to provide a system in which the server makes intelligent decisions about the media streaming or data transfer process.

It is also an object of the present invention to provide a system that does not have any minimum client system requirements but which adapts to the capabilities of the client.

It is another object of the present invention to provide a system that streams multimedia data on demand, such as video/audio on demand.

It is a further object of the present invention to provide a system that adapts the media format to the client capabilities and adapts the streaming process according to the client capabilities and user specifications.

It is also an object of the present invention to allocate resources on the server, client and network based on the client capabilities and user specifications.

It is an object of the present invention to optimize playback of the asset to the client based on the client capabilities and user specifications or preferences.

The above objects can be attained by a system in which a server processor coupled to a client processor receives client processor capabilities in association with a request for service for a multimedia type data transfer. The server determines the characteristics of the transfer to the client based on the capabilities and preferences. The server can also obtain the preferences of the user for the transfer and respond based on the preferences. The capabilities and preferences can be obtained via a query from the server to the client or can be automatically sent with each request.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
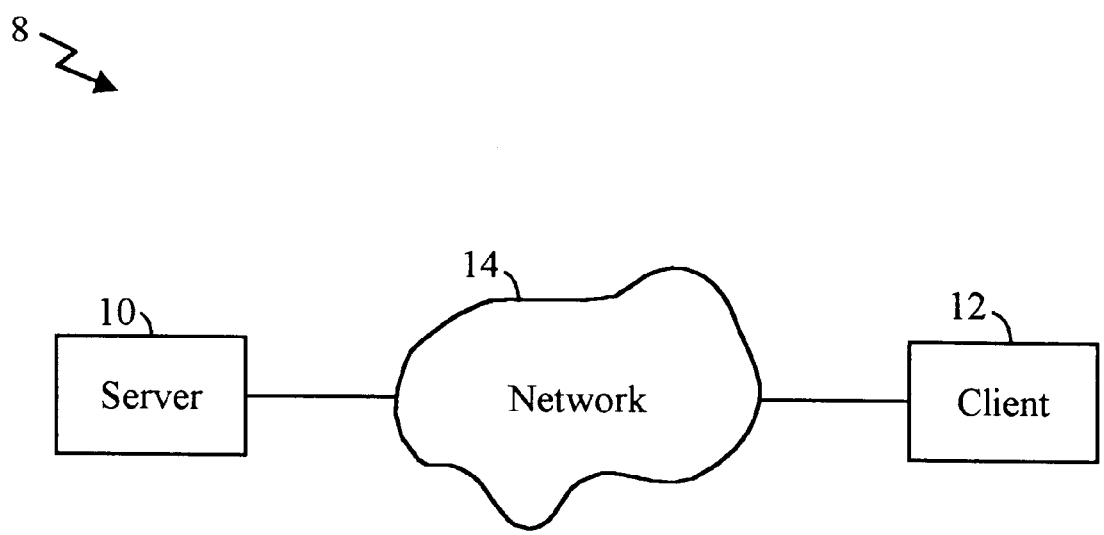
FIG. 1 depicts a system according to the present invention.

The system 8 of the present invention, as illustrated in FIG. 1, typically includes a server computer/processor 10 coupled to a client computer/processor 12 through a conventional network 14, such as a packet-switched network like the Internet or an intranet. The server processor 10 is typically a conventional server system, such as the Origin 2000™ available from SGI. The client processor 12 is a conventional system, such as a personal computer, having network browsing capabilities. In this system 8, a user (not shown) makes a request for a multimedia resource, typically a streamable resource or one capable of being streamed, such as video data, from the server 10 using the client 12 over the network 14 using a universal resource locator (URL). The locator indicates the multimedia data to be streamed or transferred. As will be discussed in more detail below, the server 10 obtains client capabilities and user preferences from the client 12 and responds to the transfer request by streaming the data over the network 14 to the client 12 based on the capabilities and preferences.

The capability based and user specifiable streaming of the present invention allows a three way communication to take place among the server 10, the client 12 and the end-user before the data gets streamed from the server 10 to the client 12. The information of this communication preferably overrides the delivery properties of the asset determined at installation time.

When the user wants to playback any video/multimedia asset by "clicking-on" it in the client 12, not only does this "play" request get shipped across to the server 10 (which is typically the case), but along with it and at the essentially same time a set of "capabilities" of the client 12 are also shipped from the client 12 to the server 10. The capabilities can be shipped and then stored in the server 10 for each client 12 for a particular session or for predetermined time period in a static configuration approach, or the capabilities can be shipped with each URL allowing dynamic configuration. When the capabilities are copied to the server, a procedure needs to be performed for each URL received to ascertain or check whether a client that has accessed the server has a client capabilities file stored on the server for the client and, if not, request the capabilities from the client. By having the capabilities sent with each URL, the overhead of the check noted above is eliminated, but an increase in overhead of the request for service is created.

Typical capabilities of a client 12 preferably sent to the server 10 include:

Client hardware type such as TV set top, PC, lap top, etc.

CPU processing power and speed, e.g. 166 Mhz Pentium or 180 Mhz R5000 MIPS.

Volatile and non-volatile memory/storage speed.

System software capabilities including type and version of operating system.

Hardware and software networking capabilities like RSVP, ATM signalling, etc.

Hardware decoders present on the client machine, such as Videoplex™ available from Optibase and Optivideo™ available from Optivision.

Software decoders present on the client machine such as RealVideo™ or RealAudio™ available from Progressive Networks.

Number and capacity of network interfaces available on the client, etc.

Types of transport/delivery mechanisms supported by the client. Pertinent information can include the type of network to be used, the transport protocols to use, the type of connection to use. For example, the user could request that the audio/video be streamed on port number 1050 using UDP/IP protocol at the IP address 199.74.38.40 on the client machine.

Quality of service for the delivered media data requested by the client. For example, the various quality of service parameters for media delivery on video on demand systems could be the frame rate of the displayed video, the bitrate of the audio and video data to use, the size of the displayed video frame to use when playing back the video.

Media formats supported by the client which can be used for choosing and delivering the correct data format. Example media formats are MPEG1, MPEG2, MJPEG, G723 audio, GSM audio.

For IRIX clients (IRIX is the UNIX operating system implementation on SGI products), this is done programmatically as will be discussed in more detail later, while for the non-IRIX clients, the client capability is specified in a flat file which resides on the client machine 12 and which is maintained in the client system and by the system administrator (or user) or by a graphical user interface. If a file is maintained in the client 12, the file needs to be updated any time that the client capabilities change, such as when a new version of an operating system is installed. Conventional software, such as Netstat™ available on UNIX systems, is available that can review and assess the hardware and software capabilities of a workstation or any UNIX based client and can be used each time it is turned on and store these capabilities in an appropriately formatted flat file.

Along with the above client capabilities, media delivery properties or preferences/specifications as chosen by the user are also shipped across to the server. Typical delivery properties chosen by the user, through a conventional graphical user interface (GUI) provided for this purpose or based on prompts of the user can include parameters such as:

Packet length.

Target network address for the delivery.

Quality of service preferred for the delivered media data. For example, the various quality of service parameters for media delivery of video on demand could be playback frame rate of the displayed video, the bit rate of the audio and video data to use, the size of the displayed video frame to use when playing back the video.

Media formats preferred to be used for the delivery of data. For example, media formats are MPEG1, MPEG2, MJPEG, G723 audio, GSM audio, etc.

Delivery mechanism preferred to be used for data streaming. Various pertinent information could be the type of networks to be used, the transport protocols to use, the type of connection to use, etc.

With the above-discussed information about the client 12 and the end-user preferences, the server 10 performs: asset selection and media data adaption; server, network and client resource allocation based on the client capability and preferences; and then starts the streaming of the multimedia data to the client 12. The above information enables the server 10 to make flexible and accurate decisions about the clients concerning resource allocation for streaming of data. The system 8 is able to:

Choose the appropriate software and hardware decoders to be used for playback of multimedia streams based on the client machine capabilities and the user preferences.

Support network traffic load balancing and choose the delivery paths for multimedia traffic from the server to the client. (The user can specify that the media streams be delivered on different network types and topologies in a decreasing order of preference, for example, ATM networks might be preferred over classic IP networks).

Adjust playback frame rate, packet length and the bit rate used for media delivery based on the client capabilities and user specification.

Choose the type of software and hardware capabilities deployed during streaming, like the use of RSVP style reservations, RTP transport protocols, etc.

Allow any application residing on a third-party machine to control and direct the media streaming process by supplying the media server the network address and the other necessary media properties for streaming of data using the above capabilities. This feature is useful in a scenario where the end-client is a dumb terminal or a dumb machine, e.g., a set-top box.

Figure 2:
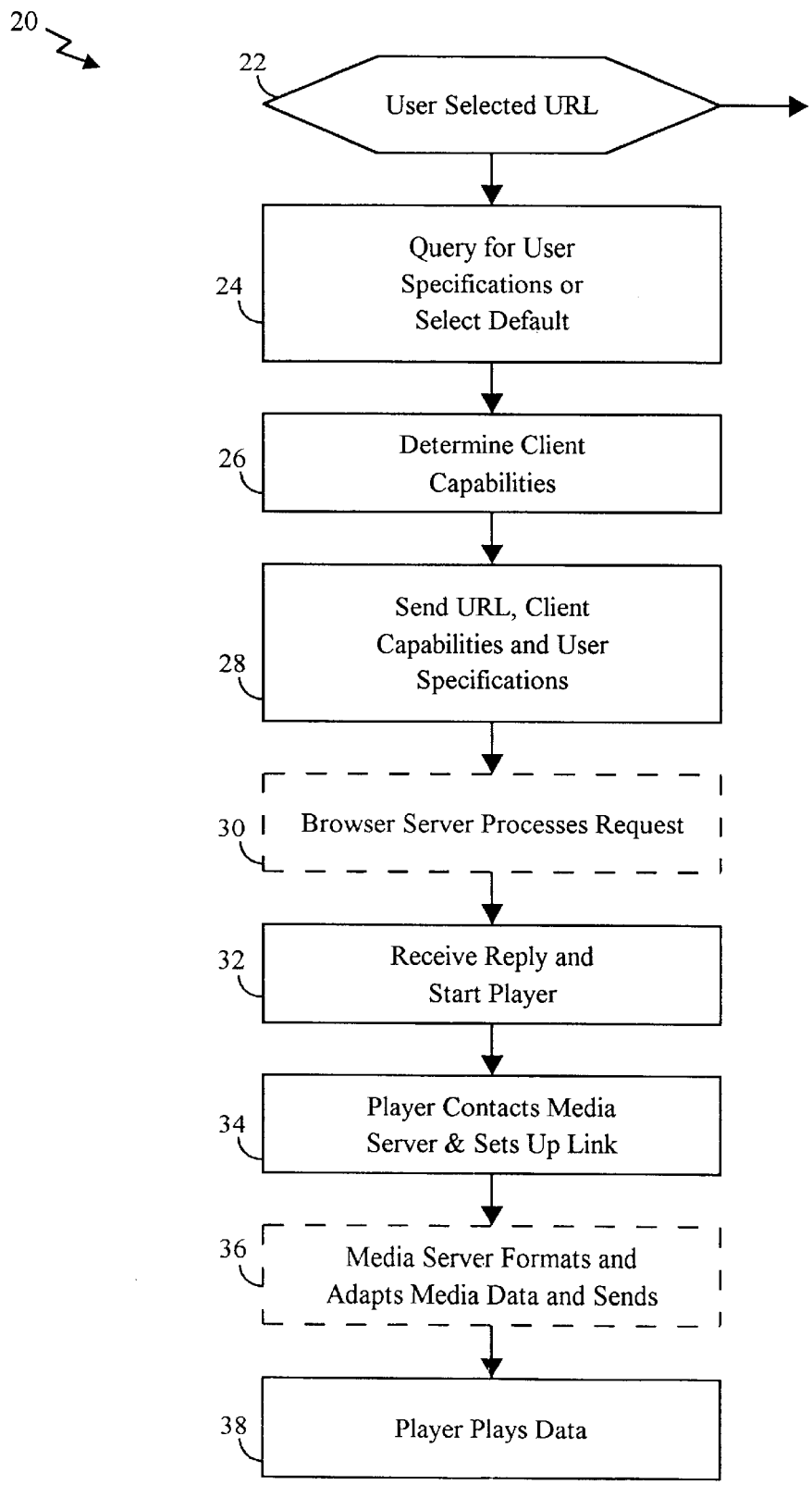
FIG. 2 illustrates the flow of a client capabilities and preferences assessment.

In implementing the present invention, the client 12 includes a native player process 20, as illustrated in FIG. 2, which is made part of or plugged into a conventional browser of the client 12, such as Internet Explorer™ from Microsoft or Netscape Navigator™ from Netscape. The process of the invention starts with the user "clicking-on" 22 the Universal Resource Locator (URL) associated with the streamable multimedia asset desired. When this occurs the process 20 prompts 24 the user for the user specifications or preferences, or selects a default set of user specifications. The capabilities of the client machine 12 are then determined 26. If the client includes a utility that stores the hardware and software configuration of the client machine 12 in a file, then this file is accessed. Otherwise the capabilities and specifications of the client 12 are probed to determine hardware and software capabilities using conventional system calls supported by conventional operating systems such as Unix or Windows. For example, a system call of "ioctl(socketdesc, SIOCGIFCONF,structure)" will determine the characteristics of all network interfaces available on a UNIX based system. The capabilities previously discussed would typically be determined in this step 26. If one or more capabilities cannot be determined, such as CPU type, the user is prompted (not shown) for the needed information. Once all the information needed or that can be obtained is obtained, the client specification, capability and user preference information is sent 28 via HTTP to the server 10 by the client 12 along with the URL and play request using the IP address and port number of the browser server executing on the hardware server 10. The browser server, such as the Netscape Server, processes 30 the request using a common gateway interface (CGI) binary script and sends a reply to the client browser executing in the client 12 where the reply includes the MIME type of the data that is to be sent. The client browser launches or starts 32 the media player of the client 12 based on the MIME type and the media player contacts 36 the media server, such as SGI MediaBase, of the server 10 to set up the type of link or type of communication session, such as RTP, RTCP. etc., used by the media player and requests the data. That is, the media player uses it's own protocol to contact the media server. This contact specifies what type of data that the player can receive, specifies the client capabilities and user specifications as well as the IP address and port number in the client to which to send the data. The media server of server 10 processes the request by formatting the data and adapting it to the client capabilities and user specifications, and then streams 36 the data to the media player of the client 12 at the address specified. The media player plays 38 the data as it is received to the user of the client 12.

A number of different protocols could be used for the initial session between the server 10 and client 12, however, the Hypertext Transfer Protocol (HTTP) is the preferred protocol since it is the one used to interface with standard web browsers. It is a simple request/response protocol which uses TCP/IP. Requests (called methods) are provided to get and create objects (real or synthesized data), and to do other operations in support of navigating a global, interconnected set of information. The subjects of the methods are identified by the Universal Resource Identifier (URI) or Locator (URL) which specifies the location (including the Internet name of the host where the information is stored) and the means to access the object. Responses are returned to the requester, such as client 12, in MIME-compatible format, allowing the MIME content-type and content-encoding to be determined by the requester, and the object presented in the appropriate way by the requester.

Once the information and URL with TCP/IP play request is sent, the client waits for the server to send the requested data. When the data/file begins to arrive or be streamed to the client 12, the data includes a header that has a MIME type identifier indicating the type of data being sent and which essentially specifies which application/plug-in/helper should play the data. When the media player is an SGI player the MIME type is X/SGIMB (SGI MediaBase). This identifier is examined and the appropriate application used to play 30 the data. For example, if the data is RealAudio™ data, the RealAudio™ application is used and the audio data of the file is played to the user.

The process for surveying the client is capabilities and sending them to a server is typically stored on a storage media, such as a disk, in the client 12.

Figure 3:
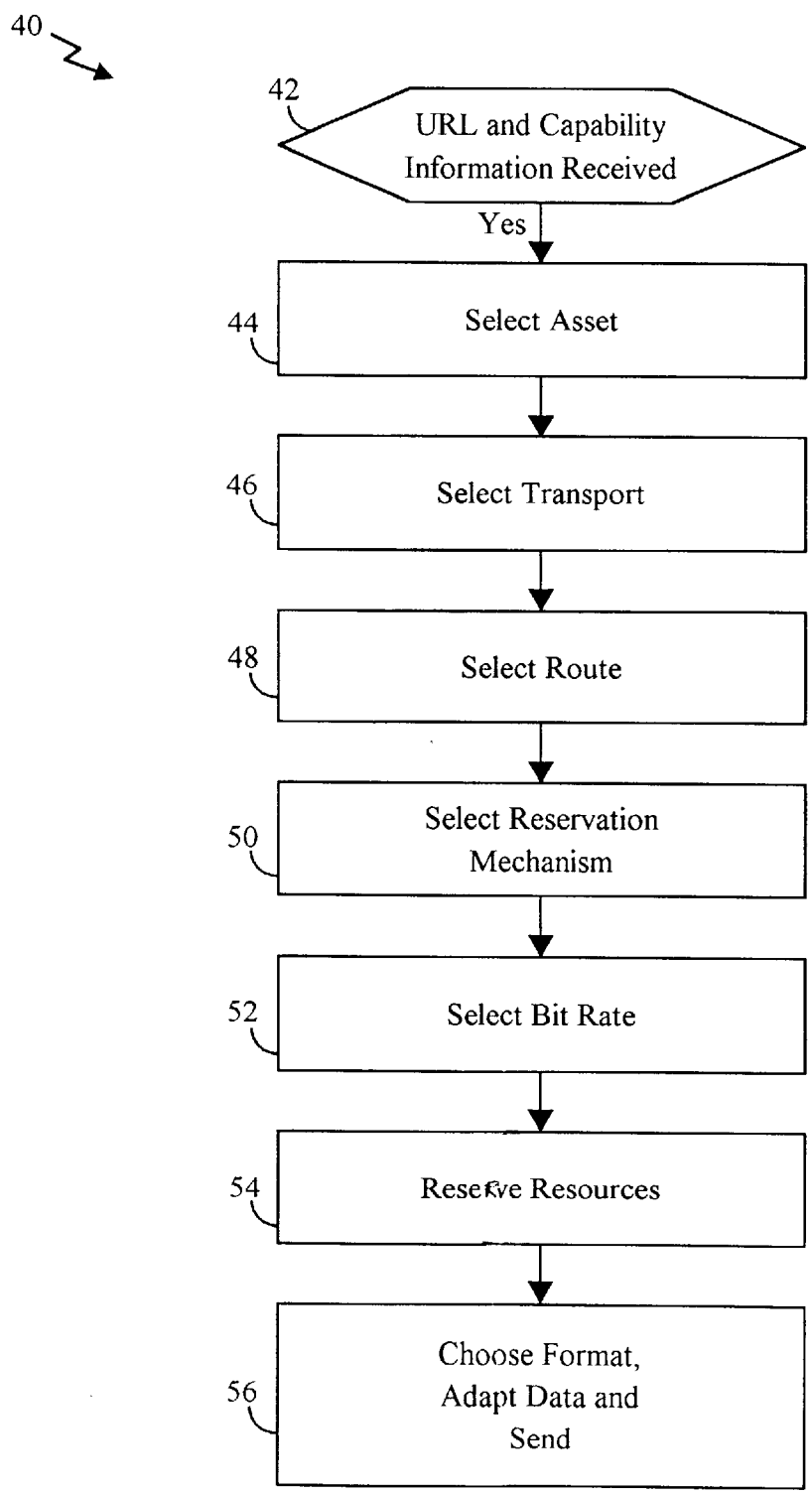
FIG. 3 depicts operations of a server.

The server 10 performs a media server process 40 as illustrated in FIG. 3, which, upon receiving 42 the URL, play request and capability/preference information, picks the appropriate media asset or real time file having the appropriate format type (MPEG1, etc.) to stream to the client 12. In case there are a number of media assets on the server which meet this criteria, for example, a video clip is stored in both MPEG1 and MPEG2 formats, the asset is chosen based on the client side information about the hardware and software decoders and the networking capabilities. The server 10 then chooses 46 the appropriate transport mechanism to use to stream the asset to the client. E.g, use Asynchronous Transfer Mode (ATM) AAL5 or User Datagram Protocol (UDP/IP). Next, the server chooses 48 the route through the network 14 that the media streams will take from the server 10 to the client 12 or to another destination as designated by the user. This includes choosing the physical network to be used for delivery. The resource reservation mechanism to be used to reserve resources on the server 10, the network 14 and the client 12 is then selected 50. For example, the server 10 could use the Reservation Protocol (RSVP) for IP networks. The bit rate of the media asset to be delivered to the client is selected 52. Given the CPU processing power, the software and hardware capabilities of the client 12, the server 10 can determine whether the client 12 will be able to cope up with media decoding on a timely basis. Based on that information, the server 10 chooses the appropriate media asset type, the correct bit rate to use, and, if necessary, dynamically adjusts the bit rate before delivering the asset to the client 12. The server 10 then reserves 54 the various server side resources necessary to stream the media asset chosen in the above decision making process. Sufficient disk bandwidth, CPU processing power and the network bandwidth is reserved to enable the server media streaming process. Once the necessary configuration has been selected, the server 10 chooses the appropriate format, adapts the data and sends 56 the data to the client 12.

The process for adapting the data stream to client capabilities and user specifications is typically stored on a storage media, such as a disk, in the server 10.

Additional information concerning media streaming can be found in "MediaBase: Streaming Media Serving for the Web" by Nelson et al, SGI, May 1997, incorporated by reference herein.

The present invention has been described with respect to an application on the client machine 12 surveying the capabilities of the client 12 and providing them to the server 10. It is possible for the server 10, at the time of an initial hit on the home page for a multimedia service, to send or stream an application to the client, such as a JAVA™ applet application in response to the initial HTTP request. However, because of the security features of JAVA which prevent "invasion" of or "snooping-in" the client 12 by a JAVA applet, the application sent by the server 10 to the client 12 is limited to asking (prompting) the user to supply the capability information of the client and asking the user for user specifications/preferences using specific questions, such as "What is the processor type of your machine?" The returned information can then be stored on the server 10 across multiple invocations of the server 10 by the client 12, so that the same questions do not get asked of the user for each request of a new asset. Questions relevant to any new asset types requested by the user can be handled with applets for the new asset type.

In multimedia streaming environments where the server streams data to a client, knowing the software and hardware capabilities of the client machine and the preferences of the user, as is possible using the present invention, allows the server to make intelligent decisions about the media streaming process. The invention also allows the server to make flexible and accurate decisions about efficient resource allocation of the server, the network and the client.

The present invention has been described with respect to transfer over a packet-switched network such as the Internet. However, the invention is applicable to other types of networks where the capabilities of the clients change and may not be completely known at the time of a transfer. This invention is also useful for any client server interaction in a distributed system, where the server has to be aware of the client capabilities and the user preferences when the server is servicing a request. Additionally, the invention has been described with respect to specific capabilities and preferences. However, the client side information can be generic enough to be useful for any client-server interaction. The invention has been described with respect to multimedia streaming, but is also applicable when a single type of data is being streamed, such as audio, where client capabilities for receiving audio data may vary between clients or over time. The invention also is applicable to other distributive multimedia collaborative applications, such as multiparty video conferencing, not to just multimedia on demand.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of transferring data from a server computer to a client computer in accordance with client media capabilities of the client computer, the method comprising:

determining media capabilities of said client computer to receive a transfer of media data from said server computer, wherein the client media capabilities comprise at least one of client computer processor type; client computer processor speed, client computer multimedia decoder type or types, including client computer multimedia decoder type or types for a plurality of encodings of a media data in a first media format and client computer multimedia decoder type or types for a plurality of encodings of a media data in different media formats; type and version of client computer operating system; client computer memory size; hardware and software network capabilities; and network interfaces available;

sending the client media capabilities to the server computer, said server computer executing a media server process that receives and processes the client media capabilities and controls the media format and media format encoding of the media data; wherein the sending of said client media capabilities to said server computer is performed a single time for multiple data transfer requests, said client media capabilities being stored and later retrieved for use in response to a later client request for a media data item without sending multiple times; and directing transfer of the media data to the client computer responsive to the media capabilities received by the server, said determining and said sending of said media capabilities occurring separately from said directing transfer of said media data.

2. A method as recited in claim 1, wherein the transfer is a data streaming transfer over a network.

3. A method as recited in claim 2, wherein the network comprises a packet-switched network.

4. A method as recited in claim 1, further comprising determining user preferences and transferring the data responsive to user preferences.

5. A method as recited in claim 4, wherein the preferences comprise one or more of: transfer protocol; quality of service desired; media format; and delivery route.

6. A method as recited in claim 4, wherein said user preferences makes a selection from among available client media capabilities.

7. A method as recited in claim 4, wherein said user preferences makes a selection from among available client media capabilities even when said user preference provides a different media format or a different media format encoding than would be selected based on said client media capabilities.

8. A method as recited in claim 4, wherein said user preferences select from among a plurality of unrelated different media formats.

9. A method as recited in claim 1, wherein if a plurality of media assets stored on the server are suited to the client's media capabilities, then selecting an asset to be sent to the client from the server based upon client side information about hardware and software decoders and networking capabilities.

10. A method as recited in claim 1, wherein a third process separate from said media server process is responsible for media format and media format encoding to satisfy a request from a client for a media data item, and said client media capabilities are stored in a storage location accessible to said third process for later use.

11. A method as recited in claim 10, wherein said third process comprises a computer program executing on said server computer.

12. A method as recited in claim 10, wherein said third process comprises a computer program executing on a third computer different from said server computer and said client media capabilities are stored in a storage location accessible to said third computer for later use.

13. A method of transferring data from a server computer to a client computer in accordance with client media capabilities of the client computer, the method comprising:

determining media capabilities of said client computer to receive a transfer of media data from said server computer, wherein the client media capabilities comprise client computer processor type;

sending the client media capabilities to the server computer, said server computer executing a media server process that receives and processes the client media capabilities and controls the media format and media format encoding of the media data; wherein the sending of said client media capabilities to said server computer is performed a single time for multiple data transfer requests, said client media capabilities being stored and later retrieved for use in response to a later client request for a media data item without sending multiple times; and directing transfer of the media data to the client computer responsive to the media capabilities received by the server, said determining and said sending of said media capabilities occurring separately from said directing transfer of said media data.

14. A method of transferring data from a server computer to a client computer in accordance with client media capabilities of the client computer, the method comprising:

determining media capabilities of said client computer to receive a transfer of media data from said server computer, wherein the client media capabilities comprise client computer processor speed;

sending the client media capabilities to the server computer, said server computer executing a media server process that receives and processes the client media capabilities and controls the media format and media format encoding of the media data; wherein the sending of said client media capabilities to said server computer is performed a single time for multiple data transfer requests, said client media capabilities being stored and later retrieved for use in response to a later client request for a media data item without sending multiple times; and directing transfer of the media data to the client computer responsive to the media capabilities received by the server, said determining and said sending of said media capabilities occurring separately from said directing transfer of said media data.

15. A method of transferring data from a server computer to a client computer in accordance with client media capabilities of the client computer, the method comprising:

determining media capabilities of said client computer to receive a transfer of media data from said server computer, wherein the client media capabilities comprise client computer multimedia decoder type or types, including client computer multimedia decoder type or types for a plurality of encodings of a media data in a first media format and client computer multimedia decoder type or types for a plurality of encodings of a media data in different media formats;

sending the client media capabilities to the server computer, said server computer executing a media server process that receives and processes the client media capabilities and controls the media format and media format encoding of the media data; wherein the sending of said client media capabilities to said server computer is performed a single time for multiple data transfer requests, said client media capabilities being stored and later retrieved for use in response to a later client request for a media data item without sending multiple times; and directing transfer of the media data to the client computer responsive to the media capabilities received by the server, said determining and said sending of said media capabilities occurring separately from said directing transfer of said media data.

16. A method of transferring data from a server computer to a client computer in accordance with client media capabilities of the client computer, the method comprising:

determining media capabilities of said client computer to receive a transfer of media data from said server computer, wherein the client media capabilities comprise type and version of the client computer operating system;

sending the client media capabilities to the server computer, said server computer executing a media server process that receives and processes the client media capabilities and controls the media format and media format encoding of the media data; wherein the sending of said client media capabilities to said server computer is performed a single time for multiple data transfer requests, said client media capabilities being stored and later retrieved for use in response to a later client request for a media data item without sending multiple times; and directing transfer of the media data to the client computer responsive to the media capabilities received by the server, said determining and said sending of said media capabilities occurring separately from said directing transfer of said media data.

17. A method of transferring data from a server computer to a client computer in accordance with client media capabilities of the client computer, the method comprising:

determining media capabilities of said client computer to receive a transfer of media data from said server computer, wherein the client media capabilities comprise client computer memory size;

sending the client media capabilities to the server computer, said server computer executing a media server process that receives and processes the client media capabilities and controls the media format and media format encoding of the media data; wherein the sending of said client media capabilities to said server computer is performed a single time for multiple data transfer requests, said client media capabilities being stored and later retrieved for use in response to a later client request for a media data item without sending multiple times; and directing transfer of the media data to the client computer responsive to the media capabilities received by the server, said determining and said sending of said media capabilities occurring separately from said directing transfer of said media data.

18. A method of transferring data from a server computer to a client computer in accordance with client media capabilities of the client computer, the method comprising:

determining media capabilities of said client computer to receive a transfer of media data from said server computer, wherein the client media capabilities comprise hardware and software network capabilities;

sending the client media capabilities to the server computer, said server computer executing a media server process that receives and processes the client media capabilities and controls the media format and media format encoding of the media data; wherein the sending of said client media capabilities to said server computer is performed a single time for multiple data transfer requests, said client media capabilities being stored and later retrieved for use in response to a later client request for a media data item without sending multiple times; and directing transfer of the media data to the client computer responsive to the media capabilities received by the server, said determining and said sending of said media capabilities occurring separately from said directing transfer of said media data.

19. A method of transferring data from a server computer to a client computer in accordance with client media capabilities of the client computer, the method comprising:

determining media capabilities of said client computer to receive a transfer of media data from said server computer, wherein the client media capabilities comprise network interfaces available;

sending the client media capabilities to the server computer, said server computer executing a media server process that receives and processes the client media capabilities and controls the media format and media format encoding of the media data; wherein the sending of said client media capabilities to said server computer is performed a single time for multiple data transfer requests, said client media capabilities being stored and later retrieved for use in response to a later client request for a media data item without sending multiple times; and directing transfer of the media data to the client computer responsive to the media capabilities received by the server, said determining and said sending of said media capabilities occurring separately from said directing transfer of said media data.

20. A method of streaming multimedia data between a server and a client over a packet-switched network, comprising:

determining multimedia data streaming capabilities of a client to receive streamed multimedia data over a packet-switched network from the server, said multimedia data streaming capabilities including: processor type, processor speed, multimedia decoder type or types, including client computer multimedia decoder type or types for a plurality of encodings of a media data in a first media format and client computer multimedia decoder type or types for a plurality of encodings of a media data in different media formats, type and version of operating system, processor memory size, hardware and software network capabilities, transport mechanism supported, and network interfaces available;

prompting a user of the client for multimedia data streaming preferences including: transfer protocol, quality of service desired, media format, and delivery route;

sending the capabilities and the preferences to the server;

formatting the multimedia data responsive to the capabilities and preferences; and transferring the multimedia data from the server to the client responsive to the multimedia streaming capabilities and preferences.

21. An apparatus, comprising:

a network;

a client coupled to said network and having client media capabilities to receive a transfer of media data, and means for sending the media capabilities, and means for sending a request for the media data; and a server coupled to said network, receiving the request and the media capabilities from the client, and transferring the media data from said server to said client responsive to the received media capabilities and the request for media data, wherein the media capabilities comprise multimedia decoder type or types, including client computer multimedia decoder type or types for a plurality of encodings of a media data in a first media format and client computer multimedia decoder type or types for a plurality of encodings of a media data in different media formats, and one or more of: processor type; processor speed; type and version of operating system; processor a memory size; hardware and software network capabilities; and network interfaces available.

22. An apparatus as recited in claim 21, further comprising a process that determines the media capabilities of the client, the process being stored in memory on the client.

23. A method of transferring data from a server computer to a client computer in accordance with client media capabilities of the client computer, the method comprising:

determining media capabilities of said client computer to receive a transfer of media data from said server computer, wherein the client media capabilities comprise identification of supported client computer multimedia decoder type or types, including client computer multimedia decoder type or types for a plurality of encodings of a media data in a first media format and client computer multimedia decoder type or types for a plurality of encodings of a media data in different media formats;

sending the client media capabilities to the server computer, said server computer executing a media server process that receives and processes the client media capabilities and controls the media format and media format encoding of the media data; and directing transfer of the media data to the client computer responsive to the media capabilities received by the server, said determining and said sending of said media capabilities occurring separately from said directing transfer of said media data.

24. A method as recited in claim 23, wherein said media server process comprises a control and management server process that directs the activities of the client and the specifically selected media server process.

25. A method as recited in claim 23, wherein said directing transfer of the media data comprises transferring said media data to the client computer from the server computer.

26. A method as recited in claim 23, wherein said directing transfer of the media data comprises transferring said media data to the client computer from the media server process executing within said server computer.

27. A method as recited in claim 26, wherein said directing transfer of the media data comprises transferring said media data to the client computer from the server computer.

28. A method as recited in claim 23, wherein said directing transfer of the media data comprises identifying a third process different from said media server process to control and direct the media data transfer to the client computer by supplying the third process with the network address of the client computer and the media encoding format.

29. A method as recited in claim 28, wherein said third process comprises a computer software program executing on said server computer.

30. A method as recited in claim 28, wherein said third process comprises a computer software program executing on a computer different from said client and said server computer.

31. A method as recited in claim 23, wherein said directing transfer of the media data comprises identifying a third process to control and direct the media data transfer to the client computer by supplying the third process with the network address of the client computer and client media capabilities.

32. A method as recited in claim 23, wherein said directing transfer of the media data comprises identifying a third computer different from said client computer and said server computer to control and direct the media data transfer to the client computer by supplying a third process executing on said third computer with the network address of the client computer and client media capabilities.

33. A method as recited in claim 23, wherein said directing transfer of the media data comprises directing an application residing on said server computer to control and direct the media data streaming process by supplying a media server of the application with the network address and the other necessary media properties for streaming of the media data.

34. A method as recited in claim 32, wherein the other necessary media properties comprise the client media capabilities.

35. A method as recited in claim 34, wherein the other necessary media properties comprise the media data encoding format to use in encoding the media data during transfer to the client computer.

36. A method as recited in claim 23, wherein said directing transfer of the media data comprises directing an application residing on a third-party computer to control and direct the media data streaming process by supplying a media server of the third-party computer with the network address and the other necessary media properties for streaming of the media data.

37. A method as recited in claim 23, wherein said directing transfer of the media data comprises directing a third process different from said media server process to provide the media data in a media format and media encoding compatible with identified client media capabilities.

38. A method as recited in claim 23, wherein said directing transfer of the media data comprises transferring said media data to the client computer from a media transfer process executing within the server computer and controlled by said media server process.

39. A method as recited in claim 23, wherein said directing transfer of the media data comprises transferring said media data to the client computer from a selected one or a plurality of media transfer processes each providing a different media encoding format and each executable within the server computer, the particular media transfer process being selectable by said media server process.

40. A method as recited in claim 39, wherein the media server process and the selected media transfer process cooperate to format the media data and adapt the media data to the client media capabilities.

41. A method as recited in claim 23, wherein:
said directing transfer of the media data comprises transferring said media data to the client computer from a selected one or a plurality of media transfer processes each providing a different media encoding format and each executable within the server computer;
the particular media transfer process being selectable by said media server process the media server process and the selected media transfer process cooperate to format the media data and adapt the media data to the client media capabilities and user specifications;
said client computer receives a compatible media data transfer only by identifying its media data capabilities to said server and without other media data format or media data encoding negotiation with the server either before receiving said media data or during reception of said media data transfer;
said media data is presented to a user of the client computer as a single logical name representing a plurality of media formats and a plurality of media data encodings within each of said plurality of media formats; and
said client receives and processes said transferred media data without using any scalable coding scheme within said media data.

42. A method as recited in claim 23, wherein said client computer receives a compatible media data transfer only by identifying its media data capabilities to said server and without other media data format or media data encoding negotiation with the server either before receiving said media data or during reception of said media data transfer.

43. A method as recited in claim 42, wherein said media data is presented to a user of the client computer as a single logical name representing a plurality of media formats and a plurality of media data encodings within each of said plurality of media formats.

44. A method as recited in claim 43, wherein the third process performs said asset selection and media data adaption based on the dynamically determined client computer media capabilities.

45. A method as recited in claim 23, wherein said client receives and processes said transferred media data without using any scalable coding scheme within said media data.

46. A method as recited in claim 23, wherein said client does not decode said media data using any scalable media data coding scheme.

47. A method as recited in claim 23, wherein said server does not code said media data using any scalable media data coding scheme.

48. A method as recited in claim 23, wherein if a plurality of media assets stored on the server are suited to the client media capabilities, then selecting a media asset to be sent to the client computer from the server computer based upon client side information about hardware and software decoders and networking capabilities.

49. A method of transferring data from a server computer to a client computer in accordance with client media capabilities of the client computer, the method comprising:
determining media capabilities of said client computer to receive a transfer of media data from said server computer, wherein the client media capabilities comprise at least one of: client computer processor type; client computer processor speed; client computer multimedia decoder type or types, including client computer multimedia decoder type or types for a plurality of encodings of a media data in a first media format and client computer multimedia decoder type or types for a plurality of encodings of a media data in different media formats; type and version of client computer operating system; client computer memory size; hardware and software network capabilities; and network interfaces available;
sending the client media capabilities to the server computer, said server computer executing a media server process that receives and processes the client media capabilities and controls the media format and media format encoding of the media data; wherein the sending of client media capabilities is performed dynamically each time a data transfer request is made by the client computer and the server computer performs asset selection and media data adaption based on the dynamically determined client computer media capabilities, and wherein the media server process executing within the server computer directs a third machine to control and direct the media data transfer process by supplying the third machine with a network address and either media format and media format encoding or client media capabilities; and
directing transfer of the media data to the client computer responsive to the media capabilities received by the server, said determining and said sending of said media capabilities occurring separately from said directing transfer of said media data.

50. A method of transferring data from a server computer to a client computer in accordance with client media capabilities of the client computer, the method comprising:

determining media capabilities of said client computer to receive a transfer of media data from said server computer, wherein the client media capabilities comprise at least one of: client computer processor type; client computer processor speed; client computer multimedia decoder type or types, including client computer multimedia decoder type or types for a plurality of encodings of a media data in a first media format and client computer multimedia decoder type or types for a plurality of encodings of a media data in different media formats; type and version of client computer operating system; client computer memory size; hardware and software network capabilities; and network interfaces available;

sending the client media capabilities to the server computer said server computer executing a media server process that receives and processes the client media capabilities and controls the media format and media format encoding of the media data; wherein the sending of client media capabilities is performed dynamically each time a data transfer request is made by the client computer and the server computer performs asset selection and media data adaption based on the dynamically determined client computer media capabilities, and directing transfer of the media data to the client computer responsive to the media capabilities received by the server, said determining and said sending of said media capabilities occurring separately from said directing transfer of said media data, wherein said directing transfer of the media data comprises identifying a third process different from said media server process to control and direct the media data transfer to the client computer by supplying the third process with the network address of the client computer and the media encoding format.

51. A method as recited in claim 50, wherein said third process comprises a computer software program executing on said server computer.

52. A method as recited in claim 50, wherein said third process comprises a computer software program executing on a third computer different from said client and said server computer.

* * * * *